United States Patent [19]

Znotins et al.

[11] Patent Number: 4,823,354
[45] Date of Patent: Apr. 18, 1989

[54] EXCIMER LASERS

[75] Inventors: Thomas A. Znotins, Ottawa; John Reid, Dundas; Steven J. Gütz, Nepean, all of Canada

[73] Assignee: Lumonics Inc., Kanata, Canada

[21] Appl. No.: 133,388

[22] Filed: Dec. 15, 1987

[51] Int. Cl.⁴ ............................................. H01S 3/10
[52] U.S. Cl. ...................................... 372/57; 372/11; 372/20; 372/32
[58] Field of Search .................. 372/57, 9, 11, 19, 20, 372/29, 32, 97, 23, 33

[56] References Cited

U.S. PATENT DOCUMENTS

| | | | |
|---|---|---|---|
| 3,471,804 | 10/1969 | Bridges et al. | 372/32 |
| 3,593,189 | 7/1971 | Buhrer | 372/32 |
| 3,921,099 | 11/1975 | Abrams et al. | 372/32 |
| 4,435,808 | 3/1984 | Javan | 372/11 |
| 4,701,607 | 10/1987 | El-Hanany et al. | 372/32 |

FOREIGN PATENT DOCUMENTS

| | | | |
|---|---|---|---|
| 0135989 | 10/1981 | Japan | 372/29 |
| 0181184 | 11/1982 | Japan | 372/9 |

OTHER PUBLICATIONS

Ishii et al.; "Saturable Absorber . . . Laser Radiation", Rev. Sci. Instrum., vol. 47, No. 5; May 1976; pp. 600-602.
Hanes et al.; "Stability, Reproducibility . . . Component"; Applied Optics, vol. 12, No. 7; Jul. 1973; pp. 1600-1605.
Spieweck; "Wavelength Stabilization . . . Cell", Applied Physics, vol. 3, No. 5; May 1974; pp. 429-430.
"Excimer Laser System for Atmospheric Remote Sensing of Ozone", by K. O. Tan et al., paper presented to Lasers '86, Orlando, Florida, Nov. 3-7, 1986.
"Excimer laser based Lithography: a deep-ultraviolet wafer stepper for VLSI", by V. Pol et al., Optical Engineering, Apr. 1987, vol. 26, No. 4, pp. 311-318.
"Spectral-narrowing techniques for excimer laser oscillators", by T. J. McKee, Canadian Journal of Physics, vol. 63, 1983.
"Ultraviolet optogalvanic laser spectroscopy of iron for reference wavelengths", by F. Babin et al., Optics Letters vol. 12, Jul. 1987, pp. 468-470.
"The $\beta$ and $\gamma$ Bands of Nitric Oxide Observed During the Flash Photolysis of Nitrosyl Chloride," by R. Engleman Jr. et al., Journal of Molecular Spectroscopy 37, (1971), pp. 240-251.
"Contribution to the Study of Electronic Spectra of Bent Triatomic Molecules", by J. Duchesne et al., The Journal of Chemical Physics, vol. 15, No. 9, Sept. 1947, pp. 631-637.
"Vibrational Analysis of the Absorption System of Sulphur Dioxide at $\lambda$, 3400-2600", by N. Metropolis, Physical Review Aug. 15, 1941, vol. 42, (Apr. 1964), pp. 627-631.
"Rotational Analysis of the 2600 Å Absorption System of Benzene", by J. H. Callomon et al., Phil. Trans. Royal Soc., vol. 259, (May 1966), pp. 499-531.
"National Research Council of Canada, Plate 1153 VAC-Spectroscopy Section", (Larger Molecules), HIA.
"Frequency of the Methane-Stabilized He-Ne Laser at 3.39 $\mu$m Measured Relative to the 10.17 $\mu$m R(32) Transition of the $CO_2$ Laser", by B. G. Whitford et al., published in Optics Communications, vol. 20, No. 2, Feb. 1977, pp. 280-283.
"Towards a New Absolute Frequency Reference Grid in the 28 Thz Range", by A. Clairon et al., published in Optics Communications, vol. 35, No. 3, Dec. 1980, pp. 368-372.
"Precise rf Tuning of cw Dye Lasers", by B. Burghardt et al., Applied Physics 20 (1979), Springer-Verlag, pp. 141-146.
"Wavelength Stabilization and Control of Pulsed or cw Tunable Dye Lasers: A Simple Scheme", by K. Kasgupta et al., Applied Optics, vol. 26, No. 17, Sep. 1, 1987, pp. 3659-3662.

Primary Examiner—William L. Sikes
Assistant Examiner—Xuan T. Vo

[57] ABSTRACT

In an excimer laser system with wavelength bandwidth narrowing, a feedback loop for monitoring and correcting the tuning of the laser employs a wavelength calibration device in the form of a gas with an absorption peak at the desired narrow wavelength. A portion of the laser output received through the gas provides the information for generating the correction signal.

19 Claims, 2 Drawing Sheets

EXCIMER LASERS

FIELD OF THE INVENTION

This invention relates to improvements in excimer lasers, and more particularly to an improved method of wavelength stabilization in an excimer laser system with wavelength bandwidth narrowing.

BACKGROUND OF THE INVENTION

While the broadband output of a free running excimer laser is adequate for many applications, for certain applications it is necessary to spectrally narrow the laser output. Two examples are remote sensing ("Excimer Laser System for Atmospheric Remote Sensing of Ozone" by K. O. Tan et al., paper presented to Lasers '86, Orlando, Fla., Nov. 3-7, 1986, as noted on the first page thereof), and excimer photolithography ("Excimer laser based lithography: a deep-ultraviolet wafer stepper for VLS1 processing" by V. Pol et al., Optical Engineering, April 1987, Vol 26, No 4, pp 311-318). In the latter case the need arises due to the difficulty of fabricating achromatic (i.e. colour corrected) lenses that operate in the deep ultraviolet. For example, Pol et al point out that the normal spectral width of a single stage KrF excimer laser is approximately 0.7 nm FWHM, whereas their lens design required a bandwidth of 0.005 nm FWHM (Full Width at Half-Maximum, i.e. the accepted way of measuring or denoting the width of a spectral peak, laser pulse, or the like).

There are several ways of line narrowing an excimer laser. These are summarized in "Spectral-narrowing techniques for excimer laser oscillators" by T. J. McKee, Canadian Journal of Physics, Vol 63, 1983, in particular in FIG. 1. These methods have become well established for all major excimer transitions, as noted in Table 2 of this McKee paper.

In certain applications, it is not sufficient to merely narrow the bandwidth of an excimer laser. A method to maintain the output fixed at the chosen narrow wavelength is also required, i.e. to constantly tune the laser. This can be done through the use of a feedback loop.

PRIOR ART

One method of achieving such a feedback is to use an analyzing etalon and a detector array to monitor the positions of the fringes. By keeping the fringes stationary, the wavelength of the laser can also be maintained constant. A detailed description of this technique is given in the Tan et al. paper mentioned above. See FIG. 1 and the paragraph headed "Wavelength Stabilization" on page 3. This technique is also discussed in the Pol et al. paper mentioned above. See the head of the column on the right hand side of page 313.

Despite the fact that this "etalon technique" has been shown to function, it suffers from certain practical disadvantages. Specifically, it is difficult to align the detecting etalon and it is difficult to keep it aligned, i.e. to avoid vibration, thermal drifting and like mechanical problems.

SUMMARY OF THE INVENTION

The present invention avoids this mechanical approach to detecting the output wavelength for feedback purposes. Instead, it monitors the laser output by means of a gas that has an absorption line at the desired narrow wavelength.

For example, a KrF excimer laser lases in the region of 248 nm. Benzene ($C_6H_6$) has two absorption peaks in this region, one at 248.432 nm and the other at 248.456, each with a very narrow bandwidth. Such a laser can be locked onto either of these peaks. Another gas that can be used with a KrF laser is gaseous iron. In the case of gaseous iron, a convenient way to generate sufficient vapour pressure is through an electric discharge. In such a discharge an alternative way of detecting an absorption is to use the opto-galvanic effect. In this technique, a simple circuit is used to measure the change in impedance of the iron gas when an absorption occurs. See "Ultraviolet opto-galvanic laser spectroscopy of iron for reference wavelengths" by F. Babin et al., Optics Letters Vol 12, July 1987 pp 468-470.

In the case of an ArF excimer laser (wavelength region 193 nm), either $SO_2$ or $CS_2$ gas, or in the case of a XeCl excimer laser (wavelength region 308 nm), either $SO_2$ or NO gas, would be an appropriate candidate for use in the present invention.

The spectral profiles of these and other gases have been analysed in detail. See, for example, (a) "The $\beta$ and $\gamma$ Bands of Nitric Oxide Observed During the Flash Photolysis of Nitrosyl Chloride," by R. Engleman Jr. et al., Journal of Molecular Spectroscopy 37 (1971) pages 240-251;

(b) "Contribution to the Study of Electronic Spectra of Bent Triatomic Molecules" by J. Duchesne et al., The Journal of Chemical Physics Vol. 15, No. 9, September 1947 pages 631-637. This paper deals, inter alia, with the absorption spectrum of $SO_2$;

(c) "Vibrational Analysis of the Absorption System of Sulphur Dioxide at $\gamma$ 3400-2600" by N. Metropolis, Physical Review Aug. 15, 1941, Vol. 42 (April 1964) pages 627-631;

(e) "Rotational Analysis of the 2600 Å Absorption System of Benzene" by J. H. Callomon et al., Phil. Trans. Royal Soc. Vol. 259 (May 1966) pages 499-531.

(f) National Research Council of Canada, Plate 1153 VAC-Spectroscopy Section (Larger Molecules), H1A.

Once an appropriate candidate gas has been identified, a high resolution spectral scan is carried out in the wavelength region of interest for the particular excimer laser to be used, as was recently done in respect of benzene to yield the exact information given above in relation to its two peaks in the 248 nm region.

The absorber gas can be either an atom or a molecule. However, in order to provide tight wavelength stabilization, it should have narrow absorption features within the tuning range of the bandwidth narrowed excimer laser.

The invention thus relates to an excimer laser including means for selecting a desired narrow wavelength bandwidth for the laser output, and a feedback loop comprising a calibration device for detecting the wavelength of said output and generating a correction signal supplied to the selecting means to maintain the desired wavelength. The characterising feature of the invention is that the calibration device comprises a cell containing a gas having an absorption peak at the desired narrow wavelength. A portion of the laser output is passed through this cell to measure the absorption by the gas at the output wavelength. This measurement provides the data for generating the correction signal.

In one form of the invention, a pair of sensors is used, one reference sensor that receives a portion of the laser output directly, i.e. not through the cell, and the other an absorption sensor that receives a portion of the laser output that has passed through the cell. A processor compares the outputs of the two sensors to generate the correction signal.

A technique known as "Lamb-dip" stabilization has been proposed for He-Ne lasers, wherein the laser wavelength has been stabilized by means of an absorption line of natural iodine vapour. See "Stability, Reproducibility, and Absolute Wavelength of a 633-nm He-Ne Laser Stabilized to an Iodine Hyperfine Component" by G. R. Hanes et al., published in Applied Optics, Vol. 12, No. 7, July 1973, pp 1600-1605. Another example of stabilizing a 3.39 μm He-Ne laser on a band of methane is described in "Frequency of the Methane-Stabilized He-Ne Laser at 3.39 μm Measured Relative to the 10.17 μm R(32) Transition of the $CO_2$ Laser" by B. G. Whitford et al., published in Optics Communications, Vol. 20, NO. 2, February 1977, pp 280-283. It is also known to lock $CO_2$ (or $N_2O$) lasers onto the saturation peaks of heavy molecules, e.g. $OsO_4$ or $SF_6$, as reported in "Towards a New Absolute Frequency Reference Grid in the 28 Thz Range" by A. Clairon et al., published in Optics Communications, Vol. 35, No. 3, December 1980, pp 368-372.

These lasers were operating in the visible and infrared regions of the spectrum, and none of the proposals involved the direct absorption technique of the present invention. Moreover, this Lamb-dip technique would not be suitable for application to a pulsed excimer laser, since the Lamb-dip technique requires setting up a region inside the laser cavity in which one has two, well defined, counter-propagating wavefronts. This is satisfactory for continuous wave lasers, which have well defined modes, but would be very difficult to achieve with the highly multimold structure of a pulsed excimer laser.

DETAILED DESCRIPTION OF THE PREFERRED EMBODIMENTS

Figure 1:
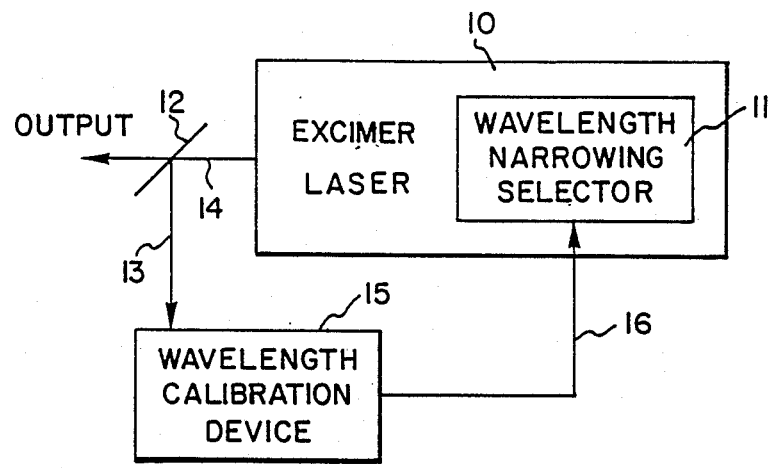
FIG. 1 illustrates diagrammatically an excimer laser system with wavelength stabilization feedback.

FIG. 1 shows an excimer laser 10 having a wavelength narrowing selector 11, e.g. a spectral narrowing device such as shown in the McKee paper referred to above. A feedback loop consists of a beam splitter 12 that passes a portion 13 of the output 14 from the laser 10 to a wavelength calibration device 15 which generates the necessary correction signal 16 that is employed to adjust the selector 11 to stabilize the wavelength.

Figure 2:
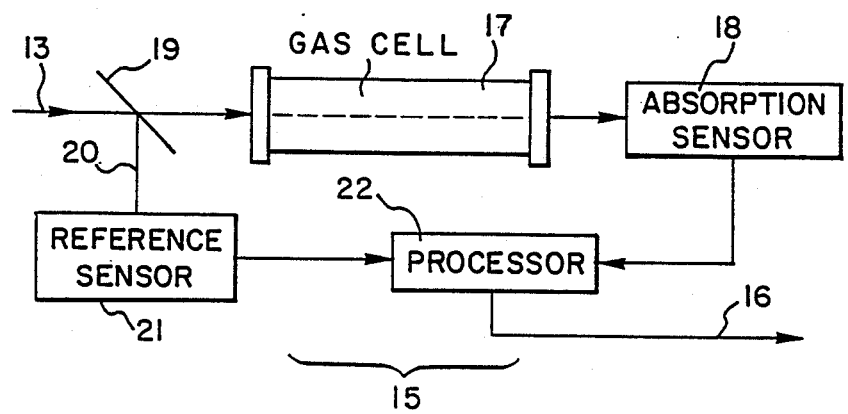
FIG. 2 shows an improved wavelength detector for use in such a system, in accordance with the present invention.

The calibration device 15 is shown in FIG. 2 and consists of a gas cell 17 through which the beam 13 is passed to an absorption sensor 18. The gas in the cell 17 will be at a low pressure, typically in the range 10-100 millibarr. A beam splitter 19 directs another portion 20 of the incoming beam 13 to a reference sensor 21. The use of two sensors ensures that the ratio between their outputs is independent of the laser pulse energy. The outputs from the sensors 18 and 21 are passed to a processor 22 that generates the correction signal 16.

However, the reference sensor 21 can be dispensed with in a case where the pulse energy can be assumed to be substantially constant over the small wavelength region involved. In this case, maintaining the signal on the sensor 18 at a minimum will determine line center.

As a further alternative, the absorption sensor 18 can be replaced by an opto-galvanic sensor such as referred to above and which would be built into the cell 17.

Figure 3A:
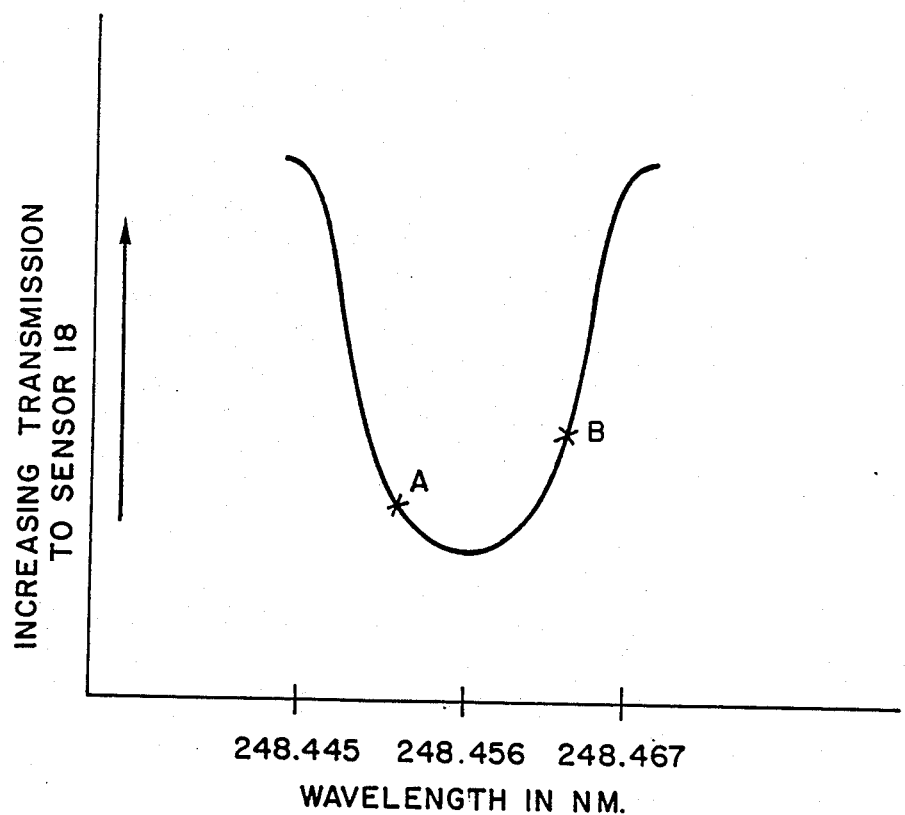
FIGS. 3a and b are diagrams for explaining the operation of the wavelength detector of FIG. 2.

FIG. 3a is a schematic representation of the signal generated in the processor 22 by comparing the outputs of the sensors 18 and 21, or as received from the sensor 18 alone if no sensor 21 is used, the benzene peak at 248.456 nm mentioned above having been taken as the example. The processor 22 is required to lock on to this peak. This result can be achieved by an algorithm that steps the laser wavelength back and forth by a known amount, i.e. between points A and B, by selectively adjusting one element of the line narrowing assembly, e.g. an etalon or a grating in the selector 11, by means of the correction signal 16. A comparison of the transmission (absorption) at points A and B then produces an error signal. If the transmission at B is greater than the transmission at A, the wavelength is jogged down. If the transmission at A is greater than at B, the wavelength is jogged up. If A=B, no correction is made, since the laser is operating at line center.

A related method steps the wavelength to the right until the transmission increases. The processor then reverses direction and steps to the left until the transmission increases once again. In both cases the laser wavelength makes small steps, e.g. steps of 0.0005 nm or approximately one sixth of the line width of the laser, back and forth across line center.

Figure 3B:
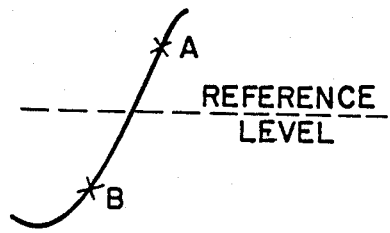

Another method locks to a fixed position on the side of the line, i.e. points A and B will be set on the same side of the peak (FIG. 3b). If the measured transmission is greater than a reference level, the wavelength is stepped to the left until the transmission is equal to the reference level. An excursion to position B results in a corrective signal to step the wavelength to the right.

Other locking algorithms can be employed. They all rely on relating the measured transmission to a position on the absorption line, and hence generating a correction signal.

All the publications referred to above are hereby incorporated herein by reference.

We claim:
1. A laser system comprising:
   (a) an excimer laser including means for selecting a desired narrow bandwidth wavelength for the laser output, and
   (b) a feedback loop connected between the laser output and said selecting means, said loop including a calibration device comprising
      (i) a processor including means for modifying said selecting means in such a manner as to step the laser wavelength between a pair of wavelength values a predetermined distance apart and located on opposite sides of the desired wavelength,
      (ii) a cell containing a gas having an absorption peak substantially at the desired wavelength,
      (iii) means for passing a portion of said output through this cell, and
      (iv) means for measuring absorption from said output by the gas in the cell at each of said wavelength values,
   (c) said processor further including means connected to said measuring means for comparing the measured absorption by the gas at said different wavelength values for generating from such comparison a correction signal indicative of the direction of any deviation of the laser output from the desired wavelength, and means for applying said signal to the selecting means to move the wavelength of the laser output in the direction towards the desired wavelength.

2. A laser system according to claim 1, wherein the excimer laser is a KrF laser and the gas is $C_6H_6$.

3. A laser system according to claim 1, wherein the excimer laser is a KrF laser and the gas is Fe.

4. A laser system according to claim 1, wherein the excimer laser is an ArF laser and the gas is $SO_2$.

5. A laser system according to claim 1, wherein the excimer laser is a ArF laser and the gas is $CS_2$.

6. A laser system according to claim 1, wherein the excimer laser is a XeCl laser and the gas is $SO_2$.

7. A laser system according to claim 1, wherein the excimer laser is a XeCl laser and the gas is NO.

8. A laser system according to claim 1, wherein the means for measuring absorption by the gas in the cell includes a pair of sensors one of which receives said portion of the laser output that has passed through the cell and the other of which receives a further portion of the laser output that has not passed through the cell, and means for comparing outputs from said sensors.

9. A laser system according to claim 8, wherein the excimer laser is a KrF laser and the gas is $C_6H_6$.

10. A laser system according to claim 8, wherein the excimer laser is a KrF laser and the gas is Fe.

11. A laser system according to claim 8, wherein the excimer laser is an ArF laser and the gas is $SO_2$.

12. A laser system according to claim 8, wherein the excimer laser is a ArF laser and the gas is $CS_2$.

13. A laser system according to claim 8, wherein the excimer laser is a XeCl laser and the gas is $SO_2$.

14. A laser system according to claim 8, wherein the excimer laser is a XeCl laser and the gas is NO.

15. A laser system according to claim 1, wherein said cell includes an opto-galvanic sensor for measuring the absorption by the gas in the cell.

16. A method of fine tuning the output of an excimer laser having means for selecting a desired narrow bandwidth wavelength, comprising (a) passing a portion of such output through a gas having an absorption peak substantially at the desired wavelength, (b) measuring the absorption of such output portion by the gas when the wavelength of the laser output is at a first value, (c) stepping the wavelength of the laser by a predetermined distance to a second wavelength value, said second value being on the opposite side of the desired wavelength from the first value, (d) measuring the absorption of such output portion by the gas when the wavelength of the laser output is said second value, (e) comparing the measurements carried out at steps (b) and (d) to generate a signal indicative of the direction of any deviation of the laser output from the desired wavelength, and (f) applying said signal to the selecting means of laser to move the wavelength of its output in the direction towards the desired wavelength.

17. A method of fine tuning the output of an excimer laser having means for selecting a desired narrow bandwidth wavelength, comprising (a) passing a portion of such output through a gas having an absorption peak substantially at the desired wavelength, (b) measuring the absorption of such output portion by the gas when the wavelength of the laser output is at a first value, (c) stepping the wavelength of the laser to said first value from at least one further wavelength value located on the same side of the desired wavelength as wavelength as said first value, (d) measuring the absorption of said output portion by the gas for each said further value, (e) comparing the measurements carried out at steps (b) and (d) to generate a further signal indicative of the direction of deviation of the laser output from the desired wavelength, and (f) applying said further signal to the selecting means of the laser to move the wavelength of its output in the direction towards said first wavelength value.

18. A method according to claim 16, wherein said laser is a KrF laser, and said gas is $C_6H_6$.

19. A method according to claim 18, wherein said desired wavelength is 248.456 nm.

* * * * *